United States Patent [19]

Iwase

[11] Patent Number: 5,056,219

[45] Date of Patent: Oct. 15, 1991

[54] METHOD OF MANUFACTURING HOLLOW ENGINE VALVE

[75] Inventor: Satoru Iwase, Obu, Japan

[73] Assignee: Aisan Kogyo Kabushiki Kaisha, Aichi, Japan

[21] Appl. No.: 608,746

[22] Filed: Nov. 5, 1990

[30] Foreign Application Priority Data

Feb. 16, 1990 [JP] Japan ................................. 2-36708

[51] Int. Cl.5 .......................................... F02B 77/02
[52] U.S. Cl. ......................... 29/888.451; 29/888.452; 29/888.46; 123/188 AA
[58] Field of Search ................... 29/888.451, 888.452, 29/888.46, 428; 123/188 A, 188 AA; 251/368

[56] References Cited

U.S. PATENT DOCUMENTS

| 1,914,786 | 6/1933 | Pirinoli | 123/188 AA |
| 2,093,773 | 9/1937 | Colwell | |
| 2,093,775 | 9/1937 | Colwell | 29/888.451 |
| 2,131,953 | 10/1938 | Jardine | 29/888.451 |
| 2,144,147 | 1/1939 | Glassford | 29/888.43 |
| 2,162,063 | 6/1939 | Crawford | 29/888.451 |
| 2,411,734 | 11/1946 | Kerwin et al. | 29/888.45 |
| 2,411,764 | 11/1946 | Thoren et al. | 29/888.45 |
| 2,452,636 | 11/1948 | Cummingham et al. | 29/888.452 |
| 2,627,259 | 2/1953 | Wood et al. | 29/888.46 |
| 4,597,367 | 7/1986 | Hayashi | 123/188 AA |
| 4,862,865 | 9/1989 | Dahlén et al. | 123/188 AA |

Primary Examiner—Irene Cuda
Attorney, Agent, or Firm—Bacon & Thomas

[57] ABSTRACT

A method of manufacturing a hollow engine valve includes the steps of inserting a core of free-cuting metal into a pipe material of heat-resistant steel to provide a shaping stock, shaping the shaping stock into a rough valve profile of a mushroom shape, subsequently forming a hole in a central portion of said rough valve profile by cutting, and sealingly plugging an open end of the hole close to the valve mushroom portion.

4 Claims, 2 Drawing Sheets

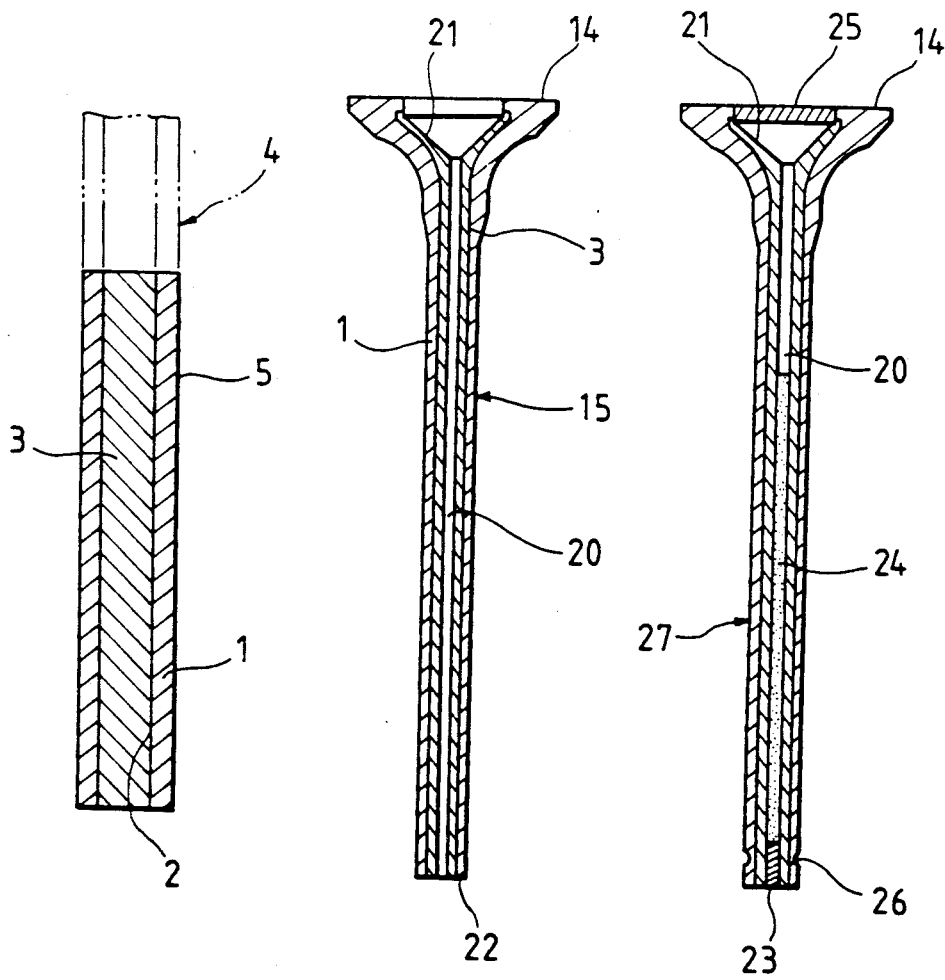

METHOD OF MANUFACTURING HOLLOW ENGINE VALVE

BACKGROUND OF THE INVENTION

1. Field of the Invention

This invention relates to a method of manufacturing a hollow engine valve for an internal combustion engine.

2. Prior Art

Generally, heat-resistant steel is used as a material for an engine valve of this type, and there are many kinds of hard-cutting materials in such heat-resistant steel. Therefore it is difficult to cut a hollow hole into such material. In view of this, Japanese Patent publication No. 29509/76 has disclosed a method in which a metal insert is inserted into and fixed to that section of a pipe material where a mushroom portion is to be formed, and then the pipe material is subjected to hot upsetting and then to hot press-shaping. The hot upsetting requires a long time because of the resistance heating of the material, and therefore has the problem that the productivity is inferior. Japanese Laid-Open (Kokai) Patent Application Nos. 179833/87 and 179835/87 disclose a method in which a hole is formed in a central portion of a valve material or stock by rear extrusion, a core of ceramics or a low melting-point material, such as copper or graphite is filled in this hole, and after a shaping operation, the core is removed by melting or crushing, thereby forming a hollow portion. With this method, however, before the mushroom-shaped portion is shaped by pressing, the separate step, that is, the rear extrusion for creating the hole, is required. Thus, this method needs more steps than the method using the pipe material, and time and labor are required for removing the elongated core by heat-melting or crushing after the shaping operation. Therefore, such a method suffers from a problem that it is not suited for mass-production.

SUMMARY OF THE INVENTION

This invention is intended to overcome the above problem of the prior art, and an object of the invention is to provide a method of manufacturing a hollow engine valve which method is excellent in productivity and is suited for mass-production.

According to the present invention, there is provided a method of manufacturing a hollow engine valve, comprising the steps of inserting a core of free-cutting metal into a pipe material of heat-resistant steel to provide a shaping stock; shaping said shaping stock into a rough valve profile of a mushroom-like shape; subsequently forming a hole in a central portion of said rough valve profile by cutting; and sealingly plugging an open end of said hole close to a valve mushroom portion.

In this invention, as the heat-resistant steel constituting the pipe material, there can be used austenite-type heat-resistant steel such as SUH35 and SUH53 and martensite-type heat-resistant steel such as SUH11, SUH3 and SUH.

In this invention, as the free-cutting metal constituting the core, there can be used free-cutting steel such as S45C and SS41 and any other suitable free-cutting material, such as aluminum, easier to be cut than the pipe material, can be used.

In the hollow engine valve manufacturing method according to the present invention, the core inserted into the pipe material prevents the pipe material from crushing, and therefore the shaping stock can be efficiently cut by shearing. Since the core is made of free-cutting metal, the core is plastically deformed together with the pipe material during the shaping operation, and also the core prevents the pipe material from crushing during the formation of a stem portion by extrusion shaping. The core is not melted even at a heating temperature of the hot forging, and therefore the shaping can be effected by hot forging. The core of freecutting metal extends through the central portion of the rough valve profile after the shaping operation, and therefore the drilling or cutting operation for forming the hollow hole can be effected easily and efficiently.

BRIEF DESCRIPTION OF THE DRAWINGS

FIGS. 1 to 4 show one preferred embodiment of the present invention;

FIG. 1 is a longitudinal cross-sectional view of a shaping stock before a shaping operation;

FIG. 3 is a longitudinal cross-sectional view of a rough valve profile after a drilling operation; and FIG. 4 is a longitudinal cross-sectional view of a valve in its finish form.

DESCRIPTION OF THE PREFERRED EMBODIMENT OF THE INVENTION

One preferred embodiment of this invention will now be described with reference to FIGS. 1 to 4.

Figure 2A:
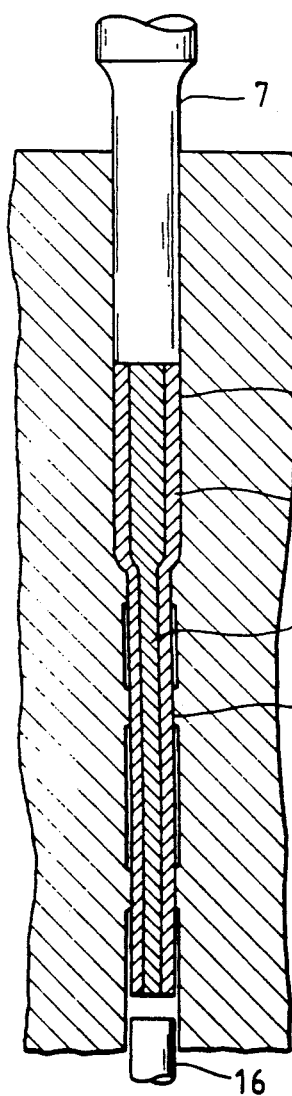
FIGS. 2A to 2C are longitudinal cross-sectional views, showing the steps of shaping the shaping stock.
Figure 2B:
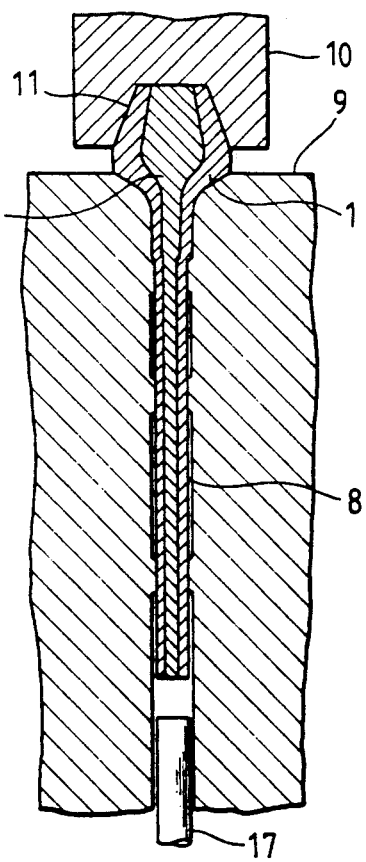
Figure 2C:
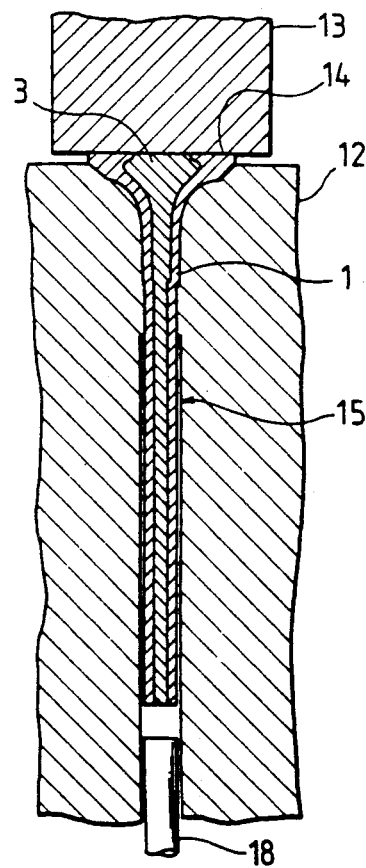

First, a core 3 in the form of a round bar of freecutting steel is inserted into a bore (hole) 2 of a pipe material 1 of heat-resistant steel to prepare an elongated shaping stock 4 having a predetermined length, for example, of 2 m. The core 3 is substantially equal in length to the pipe material 1, and the outer diameter of the core 3 is slightly smaller than the inner diameter of the bore 2. The elongated shaping stock 4 is transferred or fed to an automatic forging machine, and during this transfer, the elongated shaping stock 4 is heated to a forging temperature, and then is cut by a shearing machine to provide a shaping stock 5 corresponding in length to a valve, as shown in FIG. 1. Then, the shaping stock 5 is subjected to the following shaping operations in the automatic forging machine. Namely, as shown in FIG. 2A, the shaping stock 5 is first subjected to extrusion by hot forging using a die 6 and a punch 7, thereby forming a stem 8. Then, as shown in FIG. 2B, the shaping stock 5 is subjected to pre-upsetting by hot forging using a die 9 and a punch 10, thereby pre-forming a valve head 11 and also reducing the diameter of the stem 8. Then, as shown in FIG. 2C, the shaping stock 5 is subjected to upsetting by hot forging using a die 12 and a punch 13 to shape a valve mushroom portion 14, thereby providing a rough valve profile 15. In FIGS. 2A to 2C, reference numerals 16 to 18 denote knockout pins. The cutting step of FIG. 1 and the shaping steps of FIGS. 2A to 2C can be continuously carried out efficiently, using the automatic forging machine.

Then, as shown in FIG. 3, a hole 20 of a diameter close to the diameter of the reduced-diameter portion of the core 3 is formed axially through the central portion of the rough valve profile 15 by drilling. Also, a tapered hole 21 of a conical shape is formed in the valve mushroom portion 14 by drilling. These drilling operations are mostly to drill the free-cutting steel portions, and therefore the drilling operations can be carried out easily and efficiently. Particularly in this embodiment, the hole 20 is a through hole, and therefore the drilling can be performed from both sides, that is, from the side of the valve mushroom portion 14 and the side of a stem end 22, and the breakage of a drill is less liable to occur.

Then, as shown in FIG. 4, a plug 23 is welded to an opening portion of the hole 20 close to the stem end 22 to sealingly plug it, and a filler 24 such as sodium is charged into the hole 20, and the open end of the tapered hole 21 is also sealingly plugged by welding. Then, according to ordinary procedures, a groove 26 is formed in the stem end portion, and surface finish grinding is applied to the surfaces, thereby providing a finished product, that is, a hollow engine valve 27.

This invention is not to be restricted to the above embodiment. For example, depending on the nature of the pipe material, the shaping steps can be carried out, using warm or cold forging. For example, where the pipe material is made of SUH11, the cold forging is used until the pre-upsetting step of FIG. 2B, which enables a longer service life of the die as compared with the case of the hot forging, and also enhances the precision of the rough profile. With respect to the drilling step of FIG. 3, the core 3 may be entirely removed, and depending on the nature of the valve material (for example, where martensite-type heat-resistant steel capable of being cut more easily than austenite-type heat-resistant steel is used), part of the pipe material 1 may be cut. The pre-shaping step of FIG. 2B out of the shaping steps can be omitted if the valve mushroom portion 14 has a small diameter. The reason for this is that since the volume of the head of the shaping stock 5 of FIG. 2A is small, the length of the material relative to its diameter before the upsetting can be so shortened that the ratio between the two is 2.5 which is less than the limit of occurrence of buckling.

In the above embodiment, the elongated shaping stock 4 is cut by shearing into the shaping stock 5 corresponding in length to one valve, and thereafter the shaping operation is carried out. Therefore, the cutting can be efficiently effected in associated relation to the operation of the automatic forging machine, and the pipe material 1 and the core 3 are united together due to a local deformation developing on the cut portion, thus providing an advantage that the core 3 is prevented from being withdrawn before the subsequent shaping operation. However, the cutting may be effected by other means than such shearing, and there may be used the pipe material 1 beforehand cut to the length of one valve, in which case the core 3 having the same length as this pipe material is inserted thereinto to provide the shaping stock 5. In this case, to prevent the core 3 from withdrawal, a fastening means such as press-deformation may be provided, if necessary.

In the above embodiment, although the hole 20 is a through hole, it may be a blind hole in which case the stem end portion is not passed through. The filling of the filler 24 may optionally be omitted.

As described above, in the present invention, there is used the shaping material having the core inserted into the pipe material, and a shaping operation for forming an insertion hole is not needed, and as is the case with the shaping of a solid material, the shaping operation such as an extrusion shaping can be smoothly carried out. Also, the shaping operation can be carried out highly efficiently, for example, using the automatic forging machine. Further, since the central portion of the rough valve profile is made of the core of free-cutting metal, the hole can be more positively formed by cutting, thus enhancing the productivity and reducing the frequency of breakage of the tool.

What is claimed is:

1. A method of manufacturing a hollow engine valve, comprising the steps of:

inserting a core of free-cutting metal into a pipe material of heat-resistant steel to provide a shaping stock;

shaping said shaping stock into a rough valve profile including a substantially mushroomshaped portion;

subsequently forming a hole axially through a central portion of said rough valve profile by cutting; and sealingly plugging an open end of said hole close to the valve mushroom portion.

2. The method of manufacturing a hollow engine valve according to claim 1, wherein said inserting step includes the step of:

inserting the core of free-cutting metal into the pipe material of heat-resistant steel to provide an elongated shaping stock;

heating said elongated shaping stock to a forging temperature; and cutting said elongated shaping stock to provide said shaping stock.

3. The method of manufacturing a hollow engine valve according to claim 1, wherein said shaping step includes the steps of:

extruding said shaping stock by hot forgoing to form a stem portion;

pre-upsetting said shaping stock which has said stem portion by hot forgoing to pre-form a valve head; and upsetting said shaping stock which has said stem portion and said valve head to provide said rough valve profile.

4. The method of manufacturing a hollow engine valve according to claim 1, wherein said plugging step includes the steps of:

sealingly plugging an open end of said hole close to said stem portion;

charging a filler into said hole; and sealingly plugging an open end of said hole close to said valve mushroom portion.

* * * * *